United States Patent [19]

Lefevre et al.

[11] Patent Number: 4,836,645
[45] Date of Patent: Jun. 6, 1989

[54] DEVICE FOR THE CONNECTION OF OPTIC FIBERS TO AN INTEGRATED OPTIC CIRCUIT AND METHOD FOR MAKING THE SAID DEVICE

[75] Inventors: Hervé Lefevre, Paris; Sambath Bann, Massy, both of France

[73] Assignee: Thomson-CSF, Paris, France

[21] Appl. No.: 135,083

[22] Filed: Dec. 18, 1987

[30] Foreign Application Priority Data

Dec. 19, 1986 [FR] France .............................. 86 17889

[51] Int. Cl.[4] .............................................. G02B 6/30
[52] U.S. Cl. ................................. 350/96.17; 350/96.15
[58] Field of Search ................ 350/96.15, 96.17, 96.11

[56] References Cited

U.S. PATENT DOCUMENTS

| 3,791,715 | 2/1974 | Lean et al. | 350/96.17 |
|---|---|---|---|
| 4,130,343 | 12/1978 | Miller et al. | 350/96.17 |
| 4,541,159 | 9/1985 | Michel et al. | 350/96.15 |
| 4,653,844 | 3/1987 | Ward | 350/96.15 |
| 4,730,883 | 3/1988 | Mori | 350/96.15 |

FOREIGN PATENT DOCUMENTS

| 0170457 | 5/1986 | European Pat. Off. | |
| 2529073 | 1/1976 | Fed. Rep. of Germany | 350/96.17 |
| 49306 | 3/1985 | Japan | 350/96.17 |
| 172001 | 9/1985 | Japan | 350/96.17 |

OTHER PUBLICATIONS

Patent Abstracts of Japan, vol. 3, No. 124, Oct. 17, 1979, (E-144), JP-A-54 100 751.
IBM Technical Disclosure Bulletin, vol. 25, No. 8, Jan. 1983, pp. 4095 and 4096, New York, G. A. Skekita, "Fiber-Optic Connector with Inherent Wrap ... "
Patent Abstracts of Japan, vol. 10, No. 45, p. 430, Feb. 21, 1986, 60-191210.
Applied Optics, vol. 21, No. 7, Apr. 1, 1982, pp. 1310-1319, J. T. Chilwell, "Prism Coupler Jig: Interference Fringer Enable Oberation of the Coupling Gap".

Primary Examiner—William L. Sikes
Assistant Examiner—Robert E. Wise
Attorney, Agent, or Firm—Oblon, Fisher, Spivak, McClelland & Maier

[57] ABSTRACT

A connecting device is disclosed wherein an end of a fiber is joined to a connecting block which has one side polished and is bonded to a side, also polished, of an integrated optic circuit. The connecting block further has another side, inclined with respect to the its first side, making it possible to illuminate the side of the connecting block and to observe the image of the interference fringes sent back by the interface between the connecting block and the integrated optic circuit. According to the method of the invention, the connecting block is positioned by observing the previous image, and the bonding is then made.

9 Claims, 3 Drawing Sheets

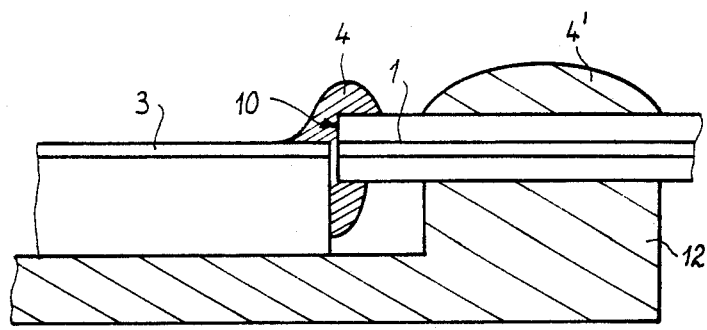
FIG_1 PRIOR ART
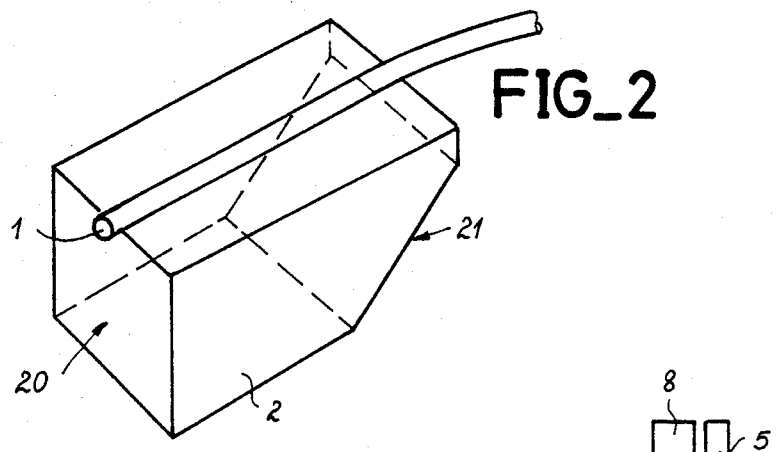
FIG_2
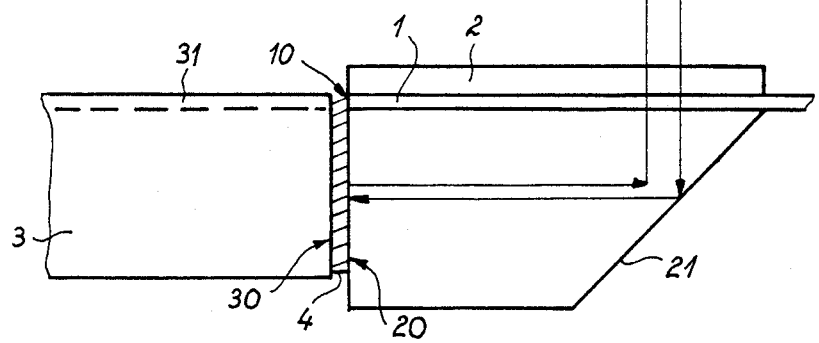
FIG_3

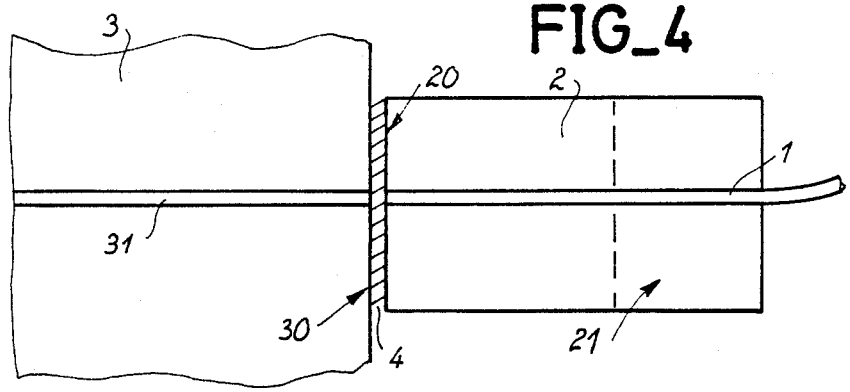
FIG_4
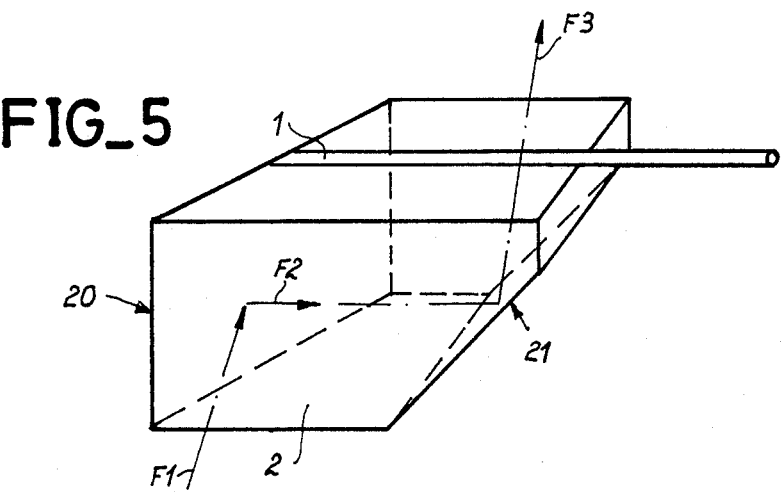
FIG_5
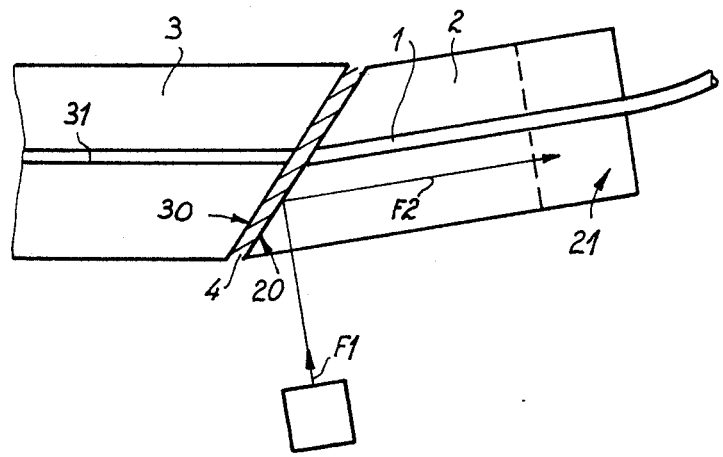
FIG_6

FIG_7
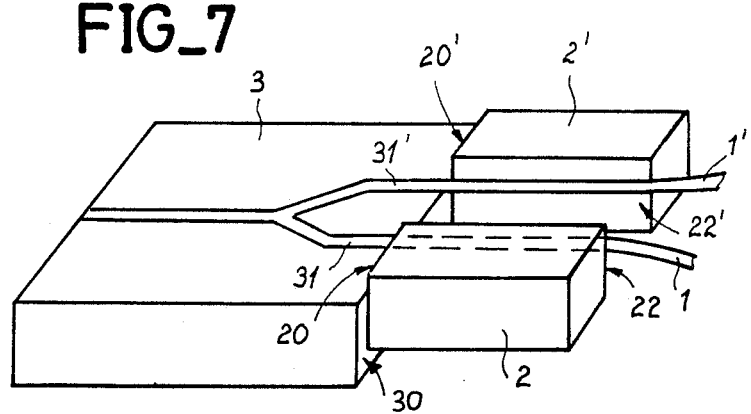
FIG_8
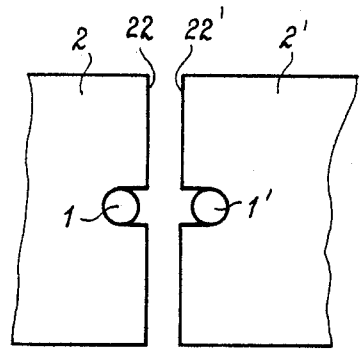
FIG_9
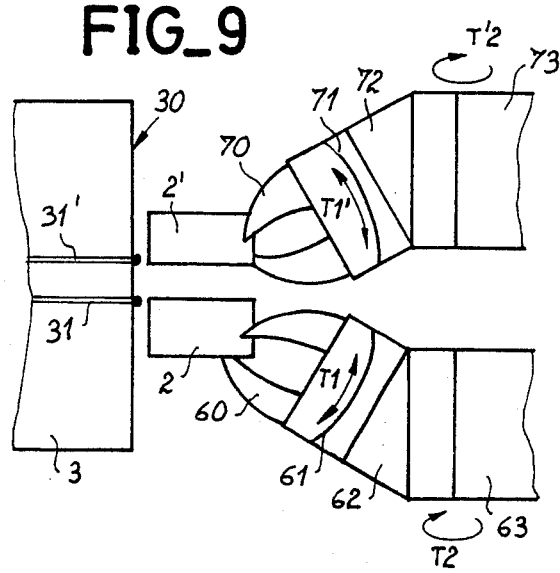

DEVICE FOR THE CONNECTION OF OPTIC FIBERS TO AN INTEGRATED OPTIC CIRCUIT AND METHOD FOR MAKING THE SAID DEVICE

BACKGROUND OF THE INVENTION

1. Field of the Invention

The invention pertains to a device for connecting optic fibers to an integrated optic circuit and to a method for making the said device. In particular, this device provides a temperature-stable and vibration-resistant means for connecting fibers to integrated optic circuits.

2. Description of the Prior Art

In prior art systems, a fiber is held steady. Then one end of the said fiber is polished or cleanly cut and the said fiber is brought near to the integrated optic circuit so as to immobilize the surface of this fibre end in a direction parallel to the entrance of the integrated optic circuit. Then, a bonder is deposited around the fiber and the integrated optic circuit so that, after bonding, the fiber and the circuit are joined to each other. This connection is reinforced by bonding the fiber to a support 12 by means of a spot of bonder 4'. Thus, an assemblied piece is obtained such as the one shown in FIG. 1 where the fiber 1 is held in a support 12. The fiber 1 has a surface 10 near an integrated optic circuit 3 and the said fiber 1 is bonded to the circuit 3 by the bonder 4.

However, with these prior art methods, it is difficult, on the one hand, to join the optic fiber perfectly with the integrated optic circuit and, on the other hand, to obtain stress resistant bonding. For a light effort frequently causes a break in the bonding. Furthermore, temperature variations may cause modifications or alterations in optic couplings.

The invention pertains to a device and a method which can resolve these difficulties.

SUMMARY OF THE INVENTION

The invention therefore pertains to a device for the connection of optic fibers to an integrated optic circuit, by which it is possible to connect an end of an optic fiber to an end of an optic guide which is flush with one side of an integrated optic circuit, the said device comprising:

a transparent connecting block in which the optic fiber is held, the said connection block possessing on the one hand, a first polished side, the plane of which is flush with the said end of the fiber, the said first side being placed parallel to the said side of the integrated optic circuit and, on the other hand, a second side inclined with respect to the first side, enabling the entry into or exit from the said connecting block of a light beam which illuminates, at a defined angle, the interface located between the first side of the connecting block and the side of the integrated optic circuit;

a layer of bonder placed between the first side of the connecting block and the side of the integrated optic circuit.

The invention also pertains to a connecting method using the connecting device, the said method comprising the following various stages:

The positioning of an optic fiber in a connecting block with an end of the fiber extending beyond the said first side of the connecting block;

The polishing or clean cutting of the said end of the fiber and the said first side as well as the polishing or clean cutting of a side of the integrated optic circuit to which the end of the fiber is to be coupled;

The positioning of the connecting block against the side of the integrated optic circuit in such a way that the first side of the connection block is parallel to the side of the integrated optic circuit;

simultaneously with the preceding stage, the illumination of the first side of the connecting block and, consequently, the illumination of the double circuit/air and air/block interface, and the observation of the interference fringes sent back by this double interface;

the lateral adjustment of the core of the fiber along the propagating direction of the optic guide;

the introduction, by capillar attraction, of a bonder between the first side of the connection block and the side of the integrated optic circuit.

BRIEF DESCRIPTION OF THE DRAWINGS

The various objects and characteristics of the invention will emerge more clearly in the following description, given by way of example, with reference to the appended figures, of which:

FIG. 1 shows a connecting device according to the prior art, already described above;

FIG. 2 shows a connector for optic fibers according to the invention;

FIGS. 3 and 4 show a device for connecting an optic fiber to an integrated optic circuit according to the invention;

FIG. 5 shows an alternative embodiment of a connector according to the invention;

FIG. 6 shows an alternative embodiment of the device for connecting an optic fiber to an integrated optic circuit according to the invention;

FIG. 7 shows an alternative embodiment of the invention, which can be used to couple two optic fibers at two points, very close to each other, of an integrated optic circuit;

FIG. 8 shows connecting devices which can be used within the scope of the alternative embodiment of FIG. 7;

FIG. 9 shows a device in which the method of the invention can be applied.

DETAILED DESCRIPTION OF THE INVENTION

FIG. 2 shows a tip or connecting block 2 that has a groove in which a fiber 1 is placed.

This connecting block has a first side 20 which, according to the example of FIG. 2, is substantially perpendicular to the fiber, and a second side 21 that makes an angle (generally one of 45°) with the first side 20.

As shown in FIG. 3, the connecting block is placed against a side 30 of an integrated optic circuit 3 with the side 20 parallel to the side 30.

The connecting block may be avantageously made of the same material as the substrate of the integrated optic circuit, for example, a compound oxide of lithium and niobium ($LiNbO^3$) and it may have the same anisotropic axes.

The connecting block is then bonded directly to the side 30 of the integrated optic circuit by means of a layer of bonder 4 having a constant predetermined thickness.

For example, the connecting block may be 3 mm. to 5 mm. long in the direction of the fiber 1, and may have a cross-section with a side of about 1 mm. to 2 mm.

To obtain good stability, it is important to reduce the thickness of the bonder 4 used to the maximum extent and to ensure that the sides 20 and 30, in contact with the circuit and the connecting block, are parallel with each other. It is therefore necessary to analyze the fringes of equal length between the two sides 20 and 30.

Since the side 21 acts as a reflecting mirror made in the connecting block, it facilitates their display and hence their analysis.

For this purpose, as shown in FIGS. 3 and 4, a light source 5 emits a light beam F0 which is transmitted by the side 21 to the double interface between the sides 20 of the connecting block and the sides 30 of the integrated optic circuit.

The light beam F1 received by these interfaces is reflected variably if the two sides 20 and 30 are not parallel. A part of this beam is reflected by the side 20 of the connecting block 2, and the other part of the beam is reflected by the side 30 of the integrated optic circuit. A beam F2 is reflected and transmits an image representing the interference fringes of the two parts of the beam reflected by the sides 20 and 30. The said image shows, on the one hand, the differences in parallelism between the sides 20 and 30 and, on the other hand, the distance between them, especially because the fringes are black when the sides are in contact.

The beam F2 is sent back by the side 21, in the form of a beam F3, to an interference-fringe observing device 8. This device 8 may quite simply be a binocular microscope.

After adjusting the parallelism of the sides 20 and 30 according to the observation made of the finges, and after adjusting the lateral position of the core of the optic fiber 1 with respect to the axis of the optic guide 31, the sides 20 and 30 are bonded by introducing the bonder between the sides 20 and 30 by capillary attraction. The two sides are then kept parallel until the bonder dries.

FIG. 7 shows a connecting device which can be used to connect two optic fibers 1 and 1' to one and the same integrated optic circuit 3, in zones that are very close to each other, at a distance of about 300 micrometers from each other for example. This type of connection can be encountered in the case of connections of fibers with the arms of one and the same integrated optic circuit, such as the arms of a Y junction or any other optic circuit such as the one shown in FIG. 7 for example.

In this case, two connecting blocks (2, 2') such as those described earlier are used.

As shown in FIG. 8, each fiber 1, 1' is placed in a groove made in one of the sides 22, 22' of a block 2, 2'. The two sides are then placed so that they face each other.

To make better quality sides 20 and 20' where the ends of the fibers 1, 1' will be flush with these sides, without there being any machining or polishing flaws on the edges of the fibers, the two blocks containing the fibers 1 and 1' are placed flat against each other by their sides 22 and 22' for the polishing of the sides 20 and 20'.

The connecting blocks are connected to the integrated optic circuit by adjusting the parallelism and then by bonding the sides 20 and 30 on the one hand and the sides 20' and 30' on the other as described above.

However, it is difficult to position the connecting blocks 2 and 2' and to adjust the parallelism of the sides 20, 30 and 20' 30' because of the small distance between the two connecting blocks 2 and 2', which may be about 300 micrometers as stated earlier.

For this, each connecting block 2, 2' is handled by means of pincers 60, 70.

Each pair of pincers 60, 70 is joined to a first cradle-type joint 61, 71 which can rotate along the arrows T1, T'1 on an axis perpendicular to the plane of the figure. Each cradle-type joint is fixed to a wedge-shaped shim, 62, 72, and the said shim is joined to a second cradle-type joint 63, 73 which can rotate along the arrows T2, T'2 on an axis contained in the plane of the figure. The wedge-shaped shims 62 and 63 have their smallest sections pointed towards each other, thus enabling the pincers 60 and 70 to move very close to each other while, at the same time, pushing away the joints 63 and 73 as well as the control devices (not shown) which control them.

In the preceding part of the description, we have not cosidered the relative refractive indices of the materials forming the fiber and the integrated optic circuit. For to take these refracting indices into account, it must be seen to it that the direction of each fiber is inclined with respect to the propagating direction of the corresponding integrated optic circuit (31, 31') as shown in FIG. 6.

For example, when the integrated optic circuit is made of lithium niobate which has a refractive index $n30 = 2.2$ and when the fiber 1 is made of silicon which has a refractive index of $n1 = 1.45$, there should be provision for inclinations with respect to the joining sides 30 and 20. The side 30 of the integrated optic circuit should be polished so that the direction of the guide 31 makes an angle of about 10° with the perpendicular to the plane of the side 30. The side 20 of the connecting block should be polished in such a way that the axis of the fiber 1 makes an angle of about 15° with the perpendicular to the plane of the side 20. The fiber 1 thus makes an angle of 5° with the direction of the optic guide 31 so that the connection is suited to the differences in indices between the fiber and the integrated optic circuit. It is quite obvious that, for the connection of several fibers, each fiber should be connected to an integrated optic circuit in meeting these conditions with respect to angles.

However, there is a problem with the system for illuminating the double interface formed by the sides 20 and 30 and for observing the interference fringes sent back by this double interface. To cope with this problem, there is provision, as shown in FIG. 5, to cut the side 20 of the connecting block in such a way that the side 20 must be illuminated at oblique incidence for the diffracted beam F2 to be reflected (as the beam F3) in a different direction from that of the light source.

For this, the perpendicular to the side 20 is not contained in a plane normal to the side 21.

As shown in FIG. 6, the source 5 emits a beam F1 which is reflected towards the side 21 by the double interface 20, 30. The side 21 reflects a beam (not shown) in a direction perpendicular to the plane of the figure.

According to the examples described above, the side 21 is used to reflect the beam F2 to direct it, at its exit, towards the observation device 8. However, it is quite obvious that the light source and the observation device 8 may be permutated and the directions of the light beams may be reversed without going beyond the scope of the invention.

It is quite obvious that the above description has been given solely as a non-exhaustive example and that other alternative embodiments may be envisaged without going beyond the scope of the invention.

What is claimed is:

1. A device for the connection of optic fibers to an integrated optic circuit, by which it is possible to connect an end of an optic fiber to an end of an optic guide which is flush with one side of an integrated optic circuit, the said device comprising:

a transparent connecting block in which the optic fiber is held, the said connection block including a first polished side flush with the said end of the fiber and positioned parallel to said side of the integrated optic circuit, and a second side inclined with respect to the first side, enabling the entry into or exit from the said connecting block of a light beam which illuminates, at a defined angle, the interface located between the first side of the connecting block and the side of the integrated optic circuit;

a layer of bonder placed between the first side of the connecting block and the side of the integrated optic circuit.

2. A connecting device according to the claim 1 wherein the first side of the connecting block makes an angle of substantially 45° with the side of the integrated optic circuit.

3. A connecting device according to the claim 1 wherein the perpendicular to the first side is not contained in a plane perpendicular to the second side.

4. A connecting device according to the claim 1 wherein two optic fibers are placed in two connecting blocks along sides of these blocks placed parallel with each other, the ends of these fibers being flush with first sides of the connecting blocks, these first sides being placed parallel to the side of the integrated optic circuit.

5. A connecting method using the connecting device according to the claim 1, comprising the steps of:

positioning an optic fiber in a connecting block with an end of the fiber extending beyond the said first side of the connecting block;

polishing or clean cutting the said end of the fiber and the said first side as well as polishing or clean cutting a side of the integrated optic circuit to which the end of the fiber is to be coupled;

positioning the connecting block against the side of the integrated optic circuit in such a way that the first side of the connecting block is parallel to the side of the integrated optic circuit, simultaneously illuminating the first side of the connecting block and the interface which comprisea a double circuit-/air and air/block interface, and observing interference fringes sent back by said double interface;

laterally adjusting the core of the fiber along the propagating direction of the optic guide; and introducing, by capillary attraction, a bonder between the first side of the connection block and the side of the integrated optic circuit.

6. Connecting method according to the claim 5 wherein said step of positioning the connecting block comprises the control of a pair of pincers mounted on goniometrical cradles, enabling orientation of the connecting block in all spatial directions.

7. Connecting method according to the claim 6 wherein, to position two optic fibers to be connected at positions that are close together on one and the same integrated optic circuit, said step of positioning the connecting block comprises the control of two devices with goniometrical cradles, each said device comprising two cradles that can be pointed orthogonally to each other, separated by a wedge-shaped shim, the two edges of the two corners of the said two devices facing each other.

8. Connecting method according to claim 7 wherein the two fibers are held in grooves made in two sides of two connecting blocks and wherein, in said step of polishing the first sides of the connecting blocks and the ends of the fibers, the two blocks are placed flat against each other by their sides containing the fibers, the polishing being done by keeping these sides flat against each other.

9. A connecting device according to claim 1, in combination with the integrated optic circuit, wherein said layer of bonder has a constant predetermined thickness.

* * * * *